United States Patent [19]

Sato et al.

[11] Patent Number: 5,701,208
[45] Date of Patent: Dec. 23, 1997

[54] CLUTCH APPARATUS FOR ZOOM LENS BARREL

[75] Inventors: Norio Sato; Hitoshi Tanaka, both of Tokyo, Japan

[73] Assignee: Asahi Kogaku Kogyo Kabushiki Kaisha, Tokyo, Japan

[21] Appl. No.: 540,539

[22] Filed: Oct. 6, 1995

[30] Foreign Application Priority Data

Oct. 7, 1994 [JP] Japan ................................ 6-270708

[51] Int. Cl.⁶ ............................................. G02B 7/02
[52] U.S. Cl. ................................... 359/822; 359/696
[58] Field of Search ............................ 359/696, 822

[56] References Cited

U.S. PATENT DOCUMENTS

| | | | |
|---|---|---|---|
| 4,149,775 | 4/1979 | Blake | 353/101 |
| 4,298,266 | 11/1981 | Ludwig | 354/786 |
| 4,958,178 | 9/1990 | Yoshida et al. | 354/195.12 |
| 5,146,260 | 9/1992 | Yamamoto | 354/400 |
| 5,222,407 | 6/1993 | Sekiguchi | 74/411 |
| 5,264,963 | 11/1993 | Ueyama | 359/695 |
| 5,349,408 | 9/1994 | Nomura et al. | 354/195.1 |
| 5,394,210 | 2/1995 | Nomura et al. | 354/195.12 |
| 5,430,516 | 7/1995 | Uziie et al. | 359/700 |

FOREIGN PATENT DOCUMENTS

| | | |
|---|---|---|
| 0027494 | 4/1981 | European Pat. Off. . |
| 4342638 | 6/1994 | Germany . |
| 2256014 | 11/1992 | United Kingdom . |

*Primary Examiner*—David C. Nelms
*Assistant Examiner*—Thomas Robbins
*Attorney, Agent, or Firm*—Greenblum & Bernstein, P.L.C.

[57] ABSTRACT

A driving apparatus for a zoom lens barrel has a driving ring for moving a lens system and a mechanism for movably supporting the driving ring for movement along an optical axis of the lens system. A gear train is supported by the supporting mechanism, a power source is provided in a camera body, and a mechanism for transmitting torque generated by the power source to the driving ring is provided. The torque transmitting mechanism includes the gear train, and a mechanism for disconnecting the torque transmission path from the power source to the driving ring if a torque above a predetermined value is applied to the driving ring. The disconnection mechanism is disposed in the gear train and is supported by the supporting mechanism.

25 Claims, 4 Drawing Sheets

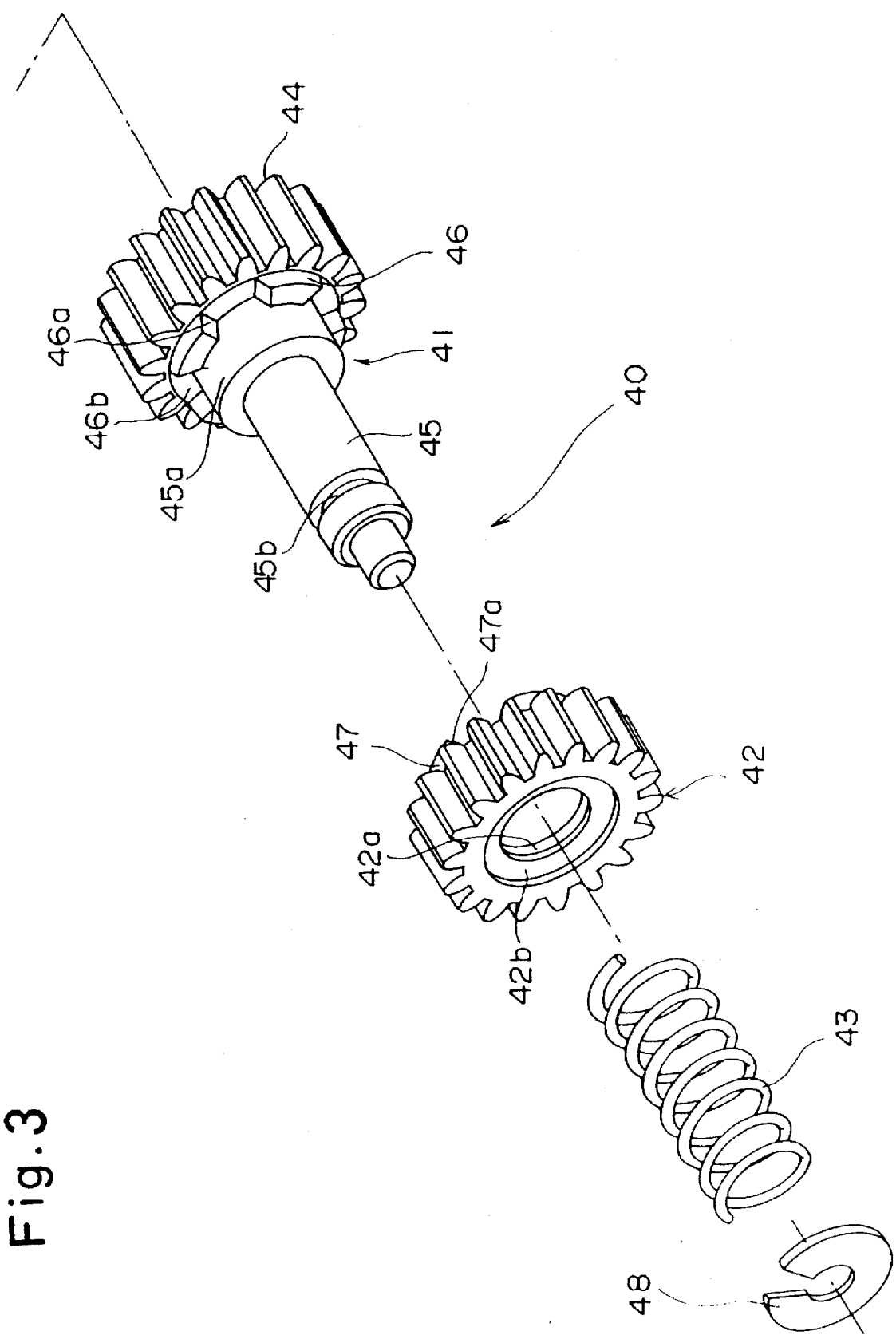

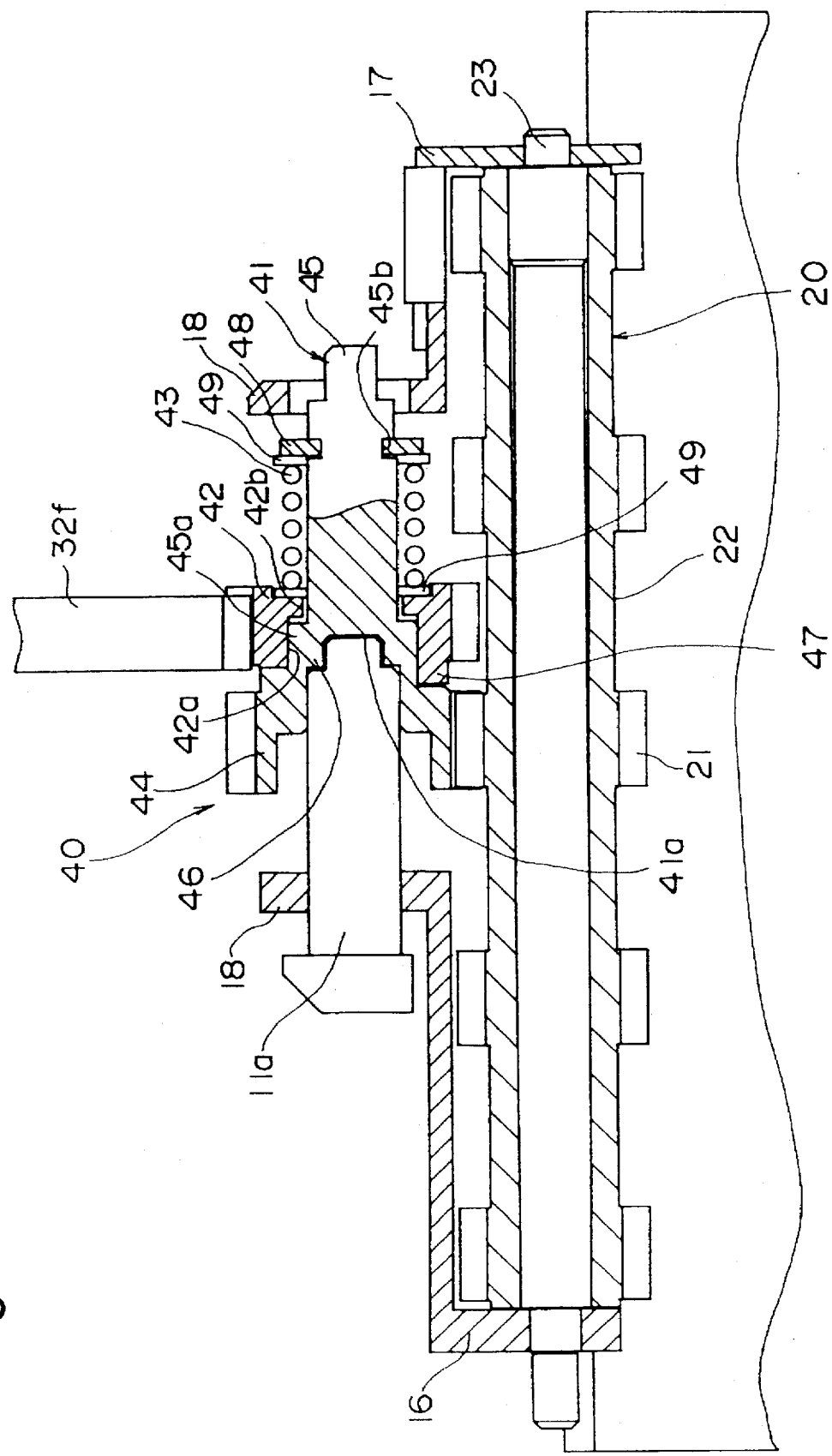

CLUTCH APPARATUS FOR ZOOM LENS BARREL

BACKGROUND OF THE INVENTION

1. Field of the Invention

The present invention relates to a zoom lens barrel, and in particular, it relates to a clutch apparatus therefor.

2. Description of Related Art

In a conventional zoom lens barrel, a cam ring, which constitutes a part of the zoom lens barrel, is in mesh with a gear mechanism, so that the rotation of a motor is transmitted to the gear mechanism through a reduction gear, in order to move the zoom lens barrel with respect to a camera body. It is also known to provide a clutch mechanism on the reduction gear in the vicinity of the motor to prevent the motor from burning.

In a zoom lens barrel which can move forward to project from the camera body to increase the zoom ratio, there is a possibility that the front end of the lens barrel will come into contact with an obstacle, pressing lens barrel toward the camera body. Consequently, a considerable load is produced by the pressure applied to the gear mechanism, which is engaged by the cam ring, in a direction to rotate the gear of the gear mechanism adjacent to the cam ring.

However, in such a known zoom lens barrel as mentioned above, there is no means for reducing or absorbing (releasing) the load in the vicinity of the gear adjacent to the cam ring. If a large load is applied to the gear mechanism or reduction gear train, the teeth of the reduction gear can be partly or entirely broken. Namely, the clutch mechanism, which is provided in the vicinity of the motor to prevent the motor from burning, is connected to the zoom lens barrel through a large number of gears, and hence, there is little chance that the clutch mechanism can reduce the external force applied to the lens barrel.

SUMMARY OF THE INVENTION

The primary object of the present invention is to provide a clutch apparatus for a zoom lens barrel in which no or little damage to the gear mechanism or reduction gear occurs, even if an external force is applied to the zoom lens barrel.

Another object of the present invention is to provide a clutch apparatus for a zoom lens barrel which can be miniaturized as a whole.

According to the present invention, there is provided a driving apparatus for a zoom lens barrel including a driving ring for moving a plurality of lens groups, a device for moveably supporting the driving ring along an optical axis of said lens groups, a gear train supported by the supporting device, a power source provided in a camera body, a device for transmitting torque generated by the power source to the driving ring. The torque transmitting device includes the gear train, and a device for disconnecting the torque transmission path from the power source to the driving ring if a torque over predetermined value is applied to the driving ring. The disconnecting device is disposed in the gear train and supported by the supporting device.

According to the present invention, an apparatus to which the present invention is applied can be miniaturized.

The present disclosure relates to subject matter contained in Japanese Patent Application No. 6-270708 (filed on Oct. 7, 1994), which expressly incorporated herein by reference in its entirety.

BRIEF DESCRIPTION OF THE DRAWINGS

The invention will be described below in detail with reference to the accompanying drawings, in which:

FIG. 3 is an exploded perspective view of a clutch mechanism shown in FIG. 1, according to the invention; and, FIG. 4 is a sectional view of the clutch mechanism shown in FIG. 1 and the surroundings thereof.

DESCRIPTION OF THE PREFERRED EMBODIMENT

Figure 1:
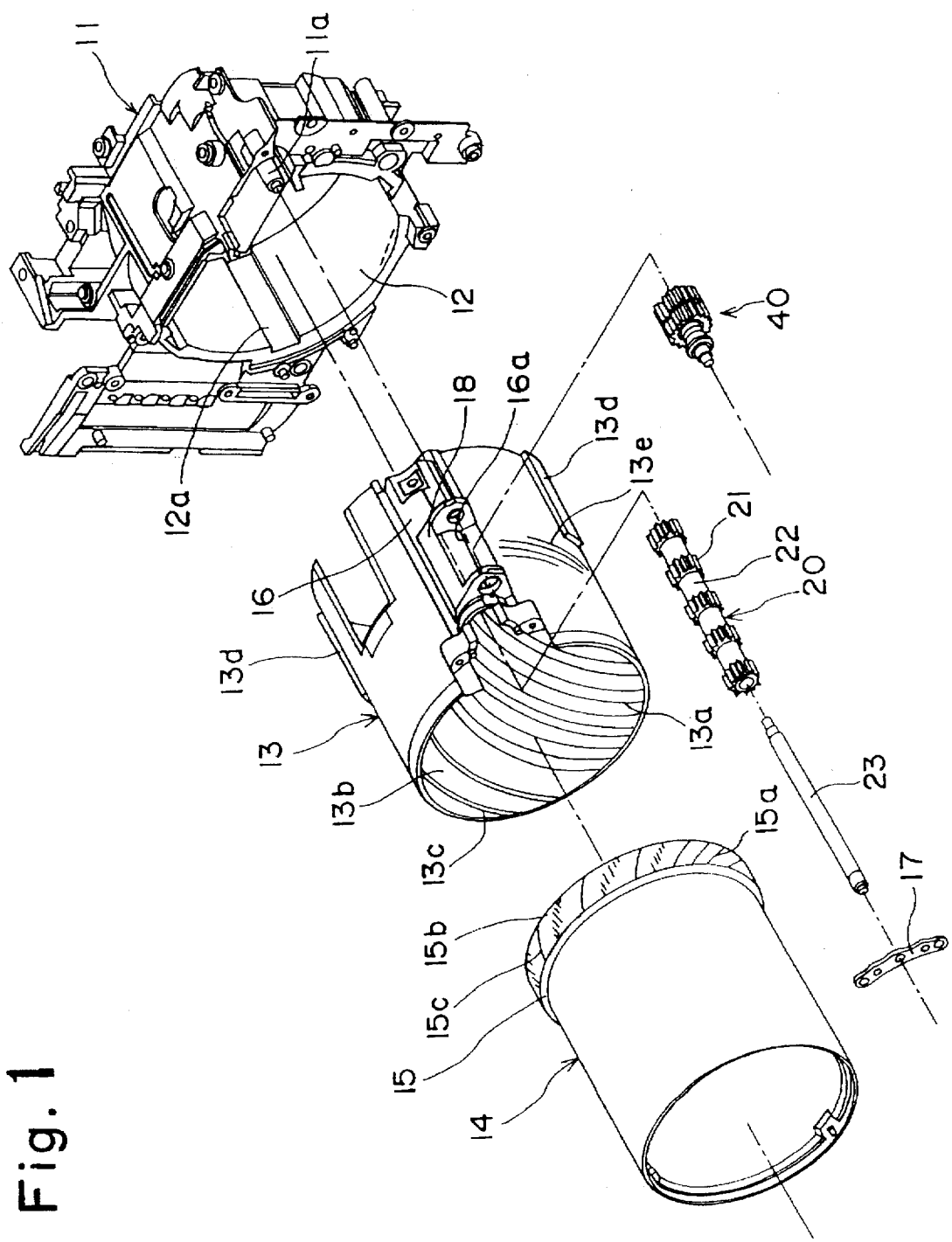
FIG. 1 is an exploded perspective view of a zoom lens barrel according to the present invention.

A zoom lens barrel, to which the present invention is applied, is comprised of three movable lens groups consisting of a first lens group L1 (FIG. 2), a second lens group L2, and a third lens group L3. The three lens groups are moved in the optical axis direction along a predetermined locus, to effect the zooming operation. Upon focusing, the second lens group L2 is moved relative to the first and third lens groups. U.S. Pat. 5,430,516 and U.S. Ser. No. 08/106,574 each show a zoom lens barrel having lens groups L1, L2 and L3, the disclosures of which are expressly incorporated herein by reference in their entirety.

In FIGS. 1 through 4, which show an embodiment of the present invention, a stationary block 11, which constitutes a part of a camera body, is provided with a cylindrical engaging portion 12 which is in turn provided on the inner peripheral surface thereof with a plurality of engaging grooves (recesses) 12a that extend in the axial direction. A plurality of engaging projections 13d, provided on the outer wall surface of a securing ring 13, are fitted in the corresponding engaging grooves 12a. Thus, the, securing ring 13 is movable in the optical axis direction, but is not rotatable with respect to the stationary block 11.

The securing ring 13 is provided on the outer peripheral surface thereof with a male helicoid 13e which mesh with a female helicoid (not shown) provided on an inner peripheral surface of an adjusting ring 71 (shown in FIG. 2), so that when the adjusting ring 71 is rotated about the optical axis in the forward or reverse direction, the securing ring 13 moves axially with respect to the camera body. Namely, upon adjusting a back focal distance, the axial position of the securing ring 13 relative to the camera body, and accordingly, relative to a film which lies in an image forming plane, is varied. When a fastening screw 77 is fastened, upon completion of the adjustment of the back focal distance, positioning teeth 78 (FIG. 2), formed on an adjusting ring 71, engage engaging teeth 76a of a positioning plate 76 secured to the stationary block 11. This secures adjusting ring 71 to the stationary block 11 at an appropriate position.

A cam ring (driving ring) 14 is provided, on the outer peripheral surface of the rear end thereof, with a connecting portion 15, on which a multiple thread (male screw portion) 15a and spur gears 15b each having a plurality of parallel threads (5 threads in the illustrated embodiment), are formed. The spur gears 15b, whose teeth are parallel with the axis of the cam ring 14, are inclined in the same direction as the multiple thread 15a. Each thread 15c of the multiple thread 15a is formed between the adjacent spur gears 15b. Alternatively, it is possible to provide more than one thread 15c, of the multiple thread 15a, between the two adjacent spur gears 15b. The multiple thread 15a, the threads 15c, and the spur gears 15b have an identical axial length.

The securing ring 13 is provided on an inner peripheral surface thereof with a multiple thread (female screw portion) 13a, grooves 13b, and thread grooves 13c, corresponding to the multiple male thread 15a, the spur gears 15b, and the threads 15c. Namely, the multiple male thread 15a and the threads 15c are screw-engaged by the multiple female thread 13a and the thread grooves 13c, respectively. The spur gears 15b are moved in the grooves 13b without coming into contact with the same, in accordance with the rotation of the cam ring 14. Consequently, when the cam ring 14 rotates, the cam ring 14 is moved in the optical axis direction with respect to the securing ring 13.

A front lens barrel 19 (FIG. 2) is provided in the cam ring 14. The front lens barrel 19 holds the first lens group L1 and is provided on the outer peripheral surface thereof with a multiple female thread (not shown) which engages with the multiple male thread (not shown) formed on the inner peripheral surface of the cam ring 14. Consequently, when the cam ring 14 rotates, the front lens barrel 19 is moved in the optical axis direction relative to the cam ring 14. As can be seen from the foregoing, when the cam ring 14 rotates, the axial movement of the cam ring 14 occurs with respect to the securing ring 13; and, the front lens barrel 19 is moved with respect to the cam ring 14.

The securing ring 13 is provided on its outer peripheral surface with a holding portion 16 which projects therefrom in the radial direction. The holding portion 16 rotatably holds therein a pinion 20. Pinion 20 is located in an axially extending opening of the securing ring 13 formed in the vicinity of the holding portion 16. Namely, the pinion 20 is exposed to the inside of the securing ring 13.

The pinion 20 functions as a gear mechanism to rotate the cam ring 14 of the zoom lens barrel. The pinion 20 is secured to a pinion shaft 23 extending therethrough, which is rotatable together with the pinion 20 about a central axis. The pinion shaft 23 is rotatably supported at one end thereof by the holding portion 16 and at the other end by a supporting plate 17 secured to the holding portion 16. Consequently, the pinion 20 is rotatable about the central axis, but is not movable with respect to the securing ring 13 in the axial or radial direction.

The pinion 20 has five connecting gears 21 which can be engaged by the spur gears 15b. There are small diameter portions 22 between the adjacent connecting gears 21. The small diameter portions 22, whose diameter is smaller than the diameter of the connecting gears 21, correspond to the threads 15c. The pinion 20 is located close to the cam ring 14 so that the connecting gears 21 are engaged by the spur gears 15b.

Figure 2:
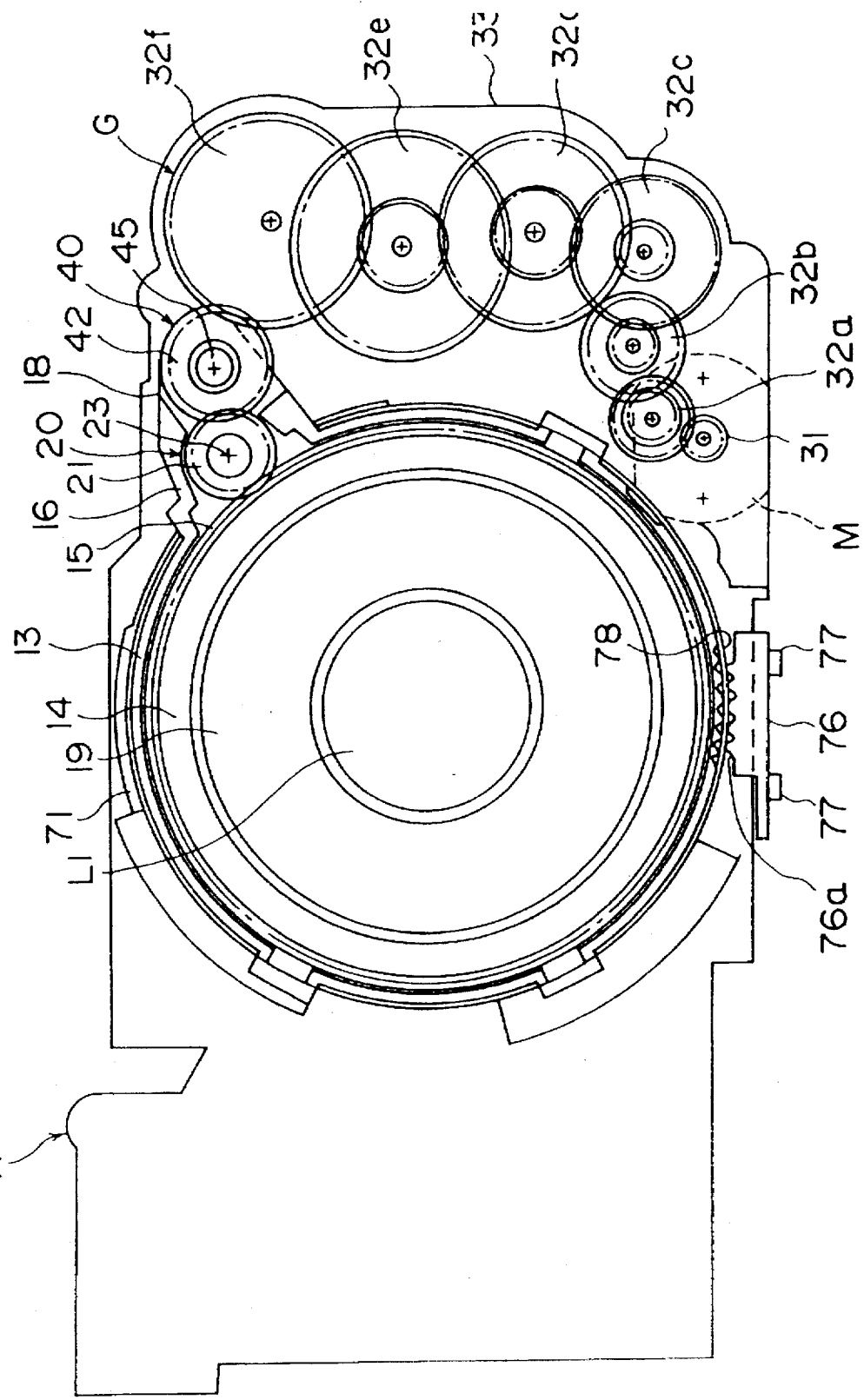
FIG. 2 is a front elevational view of a camera body to which the present invention is applied.

The motor M shown in FIG. 2 constitutes a drive source to move the zoom lens barrel. The rotation of the motor M is transmitted to the cam ring 14 through a reduction gear train G, etc. The reduction gear train G is comprised of reduction gears 32a, 32b, 32c, 32d, 32e, and 32f, and a motor pinion 31 secured to the drive shaft of the motor M. The motor pinion 31 is connected to the reduction gear 32a. Consequently, the rotation of the motor M successively transmitted to the reduction gears 32a, 32b, 32c, 32d, 32e, and 32f through the motor pinion 31.

The reduction gears 32a through 32f are located in a gear holder 33, and the motor M is also secured to the gear holder 33. The gear holder 33 is secured to the stationary block 11 to surround the securing ring 13.

A clutch mechanism 40 is provided between the terminal gear 32f of the reduction gear train G and the pinion 20. In other words, the clutch mechanism 40 is engageable with both the terminal gear 32f and the pinion 20. The clutch mechanism 40 disconnects a load transmission path when a load above a predetermined value is applied to the cam ring 14 and the gears in a direction of rotation thereof, which will be discussed hereinafter.

As may be seen in FIGS. 3 and 4, the clutch mechanism 40 is comprised of a first transmission gear 41 which can be engaged by the pinion 20, a second transmission gear 42 which can be engaged by the terminal gear 32f and is rotatable together with the first transmission gear 41, and a coil spring 43 which biases the first and second transmission gears 41 and 42 to rotate together.

The first transmission gear 41 is comprised of a gear portion 44 and a shaft portion 45 which projects from the gear portion 44 in the axial direction. The gear portion 44 engages with one of the connecting gears 21 of the pinion 20, which is exposed through the cut-away portion 16a (FIG. 1) formed in the supporting portion 16. The first transmission gear 41 is provided with a recess 41a (FIG. 4) in which the projection 11a, provided on the stationary block 1i, is rotatably fitted. Thus, the clutch mechanism 40 is supported by the stationary block 11. The shaft portion 45 is provided with a groove 45b in which a C-shaped retaining ring 48 is fitted.

The first transmission gear 41 is provided, on the side thereof adjacent to the shaft portion 45, with a plurality (e.g. 4) of first engaging projections (first engaging portions) 46 which are circumferentially spaced around the shaft 45. The first engaging projections 46 are each provided with tapered side surfaces 46a, so that the width of the first engaging projections gradually decreases toward the front ends thereof in the axial direction. There are first grooves 46b between the adjacent first engaging projections 46.

The second transmission gear 42, whose diameter is substantially identical to the diameter of the gear portion 44 of the first transmission gear 44, is provided with a central bore 42a in which a large diameter portion 45a of the shaft portion 45 is fitted. Consequently, the second transmission gear 42 is supported by the first transmission gear 41 to rotate and move in the axial direction.

The surface of the second transmission gear 42, located adjacent to the first transmission gear 41, is provided with second engaging projections (second engaging portions) 47 whose shape corresponds to the shape of the first grooves 46b. Namely, the second engaging projections 47 are each provided with tapered side surfaces 47a, so that the width of the second engaging projections gradually decreases toward the front ends thereof in the axial direction, similar to the first engaging projections 46. Thus, the second engaging projections 47 can be fitted in the corresponding first grooves 46b.

As shown in FIG. 4, the first and second transmission gears 41 and 42 are provided on the same shaft parallel with the pinion shaft 23. The first transmission gear 41 can be selectively engaged by one of the connecting gears 21. The second transmission gear 42 is located between the adjacent connecting gears 21 to engage with the terminal gear 32f.

The coil spring 43 is provided around the shaft portion 45 between a flange 42b formed on the second transmission gear 42 and the C-shaped retainer 48 through washers 49. The coil spring 43 presses the second transmission gear 42 against the gear portion 44 of the first transmission gear 41 with a predetermined biasing force. The biasing force of the coil spring 43 can be optionally determined in accordance with the spring constant and the elastic expansion, etc.

The clutch mechanism 40 as constructed above is located between the stationary block 11 and the securing ring 13. Namely, the clutch mechanism 40 is housed in a clutch holder 18 provided on and along the outer peripheral surface of the supporting portion 16 of the securing ring 13. The shaft portion 45 of the clutch mechanism 40 is supported at one end thereof by a supporting portion (not shown) of the gear supporting member 33 fitted in a hole of the clutch holder 18 and at the other end by the projection 11a formed on the stationary block 11, respectively.

The clutch mechanism as constructed above operates as follows. When the motor M is driven, the second transmission gear 42 is rotated through the motor pinion 31 and the reduction gears 32a through 32f. Since the first engaging projections 46 engage with the second engaging projections 47, due to the biasing force of the coil spring 43, the first transmission gear 41 rotates together with the second transmission gear 42 to thereby rotate the cam ring 14 through the pinion 20. Consequently, the cam ring 14 and the front lens barrel 19 are moved in the optical axis direction to carry out the zooming operation.

For example, when the motor M is stopped, if an external force is applied to the lens barrel, then the external force is transmitted to the cam ring 14 and the gears as a load in the direction of rotation thereof. In particular, in the projected position of the zoom lens barrel in which the zoom lens barrel projects relatively far from the camera body, the front end of the zoom lens barrel tends to come into contact with an external member or obstacle, or the zoom lens barrel tends to receive a rotational movement, so that a relatively large external force is often applied thereto.

However, in the illustrated embodiment of the present invention, when a load above a predetermined value is applied, the clutch mechanism 40 operates to disconnect the load transmission path. Namely, the first and second engaging projections 46 and 47 of the clutch mechanism 40 are moved to ride over the associated oblique surfaces 47a and 46a. Note that the second transmission gear 42 is moved in the axial direction of the shaft portion 45 while rotating, so that the coil spring 43 is compressed. After the first and second engaging projections 46 and 47 ride over the oblique surfaces, the first and second engaging projections are moved into the grooves adjacent thereto. This operation is repeated during an application of a load above a predetermined value. Consequently, the load is reduced or absorbed in the direction of rotation, and hence, no damage to the pinion 20 or the reduction gears of the clutch mechanism G occurs.

Since the clutch mechanism 40 is provided between the pinion 20, which rotates the cam ring 14 of the zoom lens barrel, and the terminal gear 32f of the reduction gear train G, no load above a predetermined value is applied at least to the reduction gear train G, thus resulting in no damage to the gears. In other words, the clutch mechanism 40 is provided relatively close to the cam ring 14 in the power transmission path, in which the power is transmitted from the motor M to the cam ring 14 of the zoom lens barrel, and accordingly, the number of the gears to which a load above a predetermined value is applied can be minimized.

Moreover, in the clutch mechanism 40 according to the present invention, the first transmission gear 41, which can be engaged by the connecting gears 21 of the pinion 20, and the second transmission gear 42, which can be engaged by the terminal gear 32f of the reduction gear train G, are provided on the same shaft; and, the connecting gears 21 of the pinion 20 are spaced apart from one another. Namely, the second transmission gear 42 is spaced from and opposed to the small diameter portions 22 of the pinion 20, and the clutch mechanism 40 is located close to the pinion 20. Consequently, in the present invention, no additional space for accommodating the clutch mechanism 40 is necessary. Thus, the apparatus can be miniaturized as a whole. Note that even if the motor M is driven in a direction to advance the zoom lens barrel to the most projected position, or even if the motor M is driven in a direction to retract the zoom lens barrel to the most retracted position, neither damage to the gears, nor burning of the motor M will occur, since the clutch mechanism 40 similarly operates so long as a load above a predetermined value is applied.

Although the coil spring 43 is used as a biasing means for biasing the first and second transmission gears 41 and 42 to rotate together in the illustrated embodiment, it is possible to instead use another elastically deformable member, such as a compression spring, a leaf spring, rubber, or an elastically deformable plastic plate, etc.

As can be understood from the above discussion, according to the present invention, a clutch apparatus for a zoom lens barrel can be provided wherein if an external force is applied to the zoom lens barrel, the gears of the gear mechanism or the reduction gear train are prevented from being partially or entirely damaged. Furthermore, an apparatus which incorporates therein such a clutch apparatus can be miniaturized as a whole.

We claim:

1. A driving apparatus for a zoom lens barrel, comprising:
    a driving ring for moving a lens system;
    means for supporting said driving ring for movement along an optical axis of said lens system;
    a gear train supported by said supporting means;
    a power source provided in a camera body;
    means for transmitting torque generated by said power source to said driving ring, said torque transmitting means including said gear train; and
    means for disconnecting a torque transmission path from the power source to the driving ring if a torque above a predetermined value is applied to said driving ring, said disconnecting means being disposed between a stationary block, which is part of the camera body, and a securing ring of a lens barrel supported in the stationary block.

2. The driving apparatus according to claim 1, wherein said means for moveably supporting said driving ring comprises a stationary block fitted in said camera body, and a securing ring supported by said stationary block.

3. The driving apparatus according to claim 2, wherein said means for transmitting torque comprises:
    a reduction gear train provided on said stationary block;
    a plurality of pinion gears provided on said securing ring, said plurality of pinion gears being positioned such that a first shaft common to said plurality of pinion gears is parallel with an optical axis of said lens system;
    a spur gear provided on an outer peripheral portion of said driving ring; and
    at least one of said plurality of pinion gears is engaged with said spur gear when said driving ring rotates in forward and backward directions.

4. The driving apparatus according to claim 3, wherein said means for disconnecting said torque transmission path comprises a clutch mechanism provided between said reduction gear train and said plurality of pinion gears along said torque transmission path.

5. The driving apparatus according to claim 4, wherein said clutch mechanism comprises:
    a first transmission gear that engages one of said plurality of pinion gears;

a second transmission gear that engages a terminal gear of said reduction gear train, said first and second transmission gears being coaxially disposed along an optical axis of said lens system, in parallel with said plurality of pinion gears; and biasing means for biasing said first transmission gear and said second transmission gear together, wherein said first and second transmission gears are arranged to rotate together under the biasing force of said biasing means in a normal torque transmission state to transmit torque from said power source to said driving ring, and wherein said first and second transmission gears at least partially separate to disconnect said torque transmission path if said torque is over said predetermined value, which is larger than said biasing force, is applied.

6. The driving apparatus according to claim 5, wherein said biasing means biases said first and second transmission gears to rotate together in said normal torque transmission state in which said torque is below said predetermined value.

7. The driving apparatus according to claim 6, wherein said first transmission gear has a second shaft extending in said optical axis direction of said lens system, said second transmission gear is coaxially disposed on said second shaft, and said biasing means is provided coaxially around said second shaft.

8. The driving apparatus according to claim 7, wherein said biasing means is a coil spring.

9. The driving apparatus according to claim 6, wherein said plurality of pinion gears are intermittently formed along said first shaft so that a diameter of said plurality of pinion gears is larger than said first shaft.

10. The driving apparatus according to claim 9, wherein said second transmission gear is arranged to face said first shaft so that a distance between an outer periphery of said second transmission gear and a surface of said first shaft is shorter than a distance between said first shaft and an outer periphery of said first transmission gear.

11. The driving apparatus according to claim 3, wherein said securing ring is provided with an opening through over which said plurality of pinion gears to engage said spur gear.

12. The driving apparatus according to claim 1, wherein said zoom lens barrel include a plurality of lens groups, and said lens system is arranged to control said plurality of lens groups.

13. The driving apparatus according to claim 1, wherein said driving ring is a cam ring.

14. The driving apparatus according to claim 1, wherein said torque above said predetermined value is caused by an external force applied to said driving ring.

15. The driving apparatus according to claim 1, wherein said disconnecting means is closer to said driving ring than to said power source.

16. A clutch apparatus for a zoom lens barrel, comprising:
a driving ring for moving a lens system;
a gear mechanism which rotates said driving ring;
a reduction gear train which transmits a rotation of a motor, to said gear mechanism, said reduction gear train including a terminal gear which meshes with said gear mechanism;
a clutch mechanism provided between the terminal gear and the gear mechanism, so that when a load above a predetermined value is applied in a direction of rotation, a load transmission path along which the load is transmitted is disconnected by the clutch mechanism; and said clutch mechanism being provided between a stationary block which is part of a camera body and a securing ring of a lens barrel supported by said stationary block.

17. A clutch apparatus according to claim 16, wherein said gear mechanism is provided with a pinion which is engaged by the driving ring, and wherein said clutch mechanism is provided with a first transmission gear which is engageable with the pinion, and a second transmission gear which can be engaged by the terminal gear of the reduction gear train and is rotatable together with the first transmission gear.

18. A clutch apparatus according to claim 17, wherein said first transmission gear is provided on a side surface thereof with a first engaging portion, and said second transmission gear is provided, on a side surface thereof opposed to the first engaging portion of said first transmission gear, with a second engaging portion which can engage the first engaging portion.

19. A clutch apparatus according to claim 18, further comprising biasing means for biasing the first and second transmission gears to rotate together when the load is below said predetermined value.

20. A clutch apparatus according to claim 19, wherein said biasing means comprises a coil spring.

21. A clutch apparatus according to claim 20, wherein said terminal gear is provided with a plurality of gear portions which are spaced a substantially identical distance in the axial direction, said first and second transmission gears being arranged parallel with an axis of the terminal gear.

22. A clutch apparatus according to claim 21, wherein said first transmission gear can engage the gear portions, said second transmission gear being spaced from, and opposed to, small diameter portions formed between the adjacent gear portions.

23. A clutch apparatus according to claim 16, wherein said driving ring is a cam ring.

24. A driving system for a lens barrel, comprising:
a power source provided in a camera body;
a driving ring for moving a lens system;
means for transmitting torque from said power source to said driving ring;
means for detecting outside force, applied from outside said driving system, to said driving ring; and
means for absorbing said outside force, detected by said detecting means, applied to said transmitting means as a load over predetermined value, said absorbing means being provided in said transmitting means between a stationary block which is part of a camera body, and a securing ring of a lens barrel support by said stationary block.

25. A clutch apparatus for a zoom lens barrel, comprising:
a driving ring for moving a lens system;
a gear mechanism which rotates said driving ring;
a reduction gear train forming a transmission path which transmits a rotation of a motor, to said gear mechanism, said reduction gear train including a terminal gear which meshes with said gear mechanism; and
a single clutch mechanism within said reduction gear train and positioned between the terminal gear and the gear mechanism, closer to said driving ring along said transmission path than to said motor, so that when a load above a predetermined value is applied in a direction of rotation, a load transmission path along which the load is transmitted is disconnected by the clutch mechanism.

* * * * *